United States Patent [19]

Strauss et al.

[11] 4,013,599
[45] Mar. 22, 1977

[54] FIRE-RETARDANT COATING COMPOSITION COMPRISING ETHERIFIED AND NON-ETHERIFIED AMINO-FORMALDEHYDE RESIN

[75] Inventors: Richard Strauss, Wiesbaden; Arnold Giller, Weren, Taunusstein; Dieter Zacharowski; Hans Wiener, both of Wiesbaden, all of Germany

[73] Assignee: Hoechst Aktiengesellschaft, Frankfurt am Main, Germany

[22] Filed: July 5, 1974

[21] Appl. No.: 485,868

Related U.S. Application Data

[63] Continuation-in-part of Ser. No. 447,372, March 1, 1974, abandoned.

[30] Foreign Application Priority Data

Mar. 28, 1973 Germany .................... 2315416

[52] U.S. Cl. .................... 260/17.3; 252/3; 252/7; 260/2.5 FP; 260/29.4 R; 428/460
[51] Int. Cl.² .................... C08L 3/02
[58] Field of Search ........ 260/17.3, 2.5 FP, 29.4 R, 260/69 N; 428/920, 921

[56] References Cited

UNITED STATES PATENTS

| 2,452,054 | 10/1948 | Jones et al. | 260/17.3 |
| 2,582,961 | 1/1952 | Burnell et al. | 260/69 N |
| 2,681,326 | 6/1954 | Christianson | 260/29.4 R |
| 3,372,131 | 3/1968 | Rohlfs et al. | 260/17.3 |
| 3,733,289 | 5/1973 | Burns et al. | 260/28.5 |

*Primary Examiner* — Edward M. Woodberry
*Attorney, Agent, or Firm* — Berman, Aisenberg & Platt

[57] ABSTRACT

An aqueous fire-retardant composition capable of forming a foam layer and consisting of I. an aqueous preparation comprising
  a. a non-etherified amino-formaldehyde resin or its components or a mixture thereof
  b. at least one ammonium phosphate,
  c. a skeleton forming component and
II. a solution of at least one further amino-formaldehyde resin being at least partially etherified with at least one alcohol having 1 to 12 C-atoms and dissolved in an organic solvent, a construction supporting unit and an electrical cable unit with a coating of said composition.

13 Claims, No Drawings

FIRE-RETARDANT COATING COMPOSITION COMPRISING ETHERIFIED AND NON-ETHERIFIED AMINO-FORMALDEHYDE RESIN

CROSS-REFERENCE TO RELATED APPLICATION

This application is a continuation-in-part of copending application Ser. No. 447,372 filed Mar. 1, 1974 and now abandoned.

BACKGROUND OF THE INVENTION

For protection of inflammable and non-inflammable building materials, and constructional parts, coating materials are used, which can be coated onto the object to be protected, in the manner of a coating-compound. In the event of fire, i.e. under the action of heat, such coatings develop a heat-insulating foam layer which hinders the action of the heat upon the coated object. In this way, wood can be made "not easily inflammable," and the "fire-resistance duration" of steel constructional parts can be considerably prolonged. Generally, the coating materials consist of urea-and/or dicyanodiamide-formaldehyde condensates, with a content of phosphates, e.g. monoammonium orthophosphate and further additives such as carbohydrates and optionally fillers such as silicic acid or kaolin. In many cases they are aqueous preparations, and therefore they have the disadvantage that it is difficult to wet smooth undersurfaces such as steel which have been coated with primer, or synthetic plastics material surfaces. Coatings made from these are caused to swell up by the moisture in the air, and are comparatively rapidly dissolved by condensed water; which, of course, quickly leads to a loss of the fire-retardant action.

Similarly-prepared fire-retardant compositions also are known, which do not contain water, but organic solvents. It is true that these are easy to use and can result in coatings which are more water-resistant; however they have the disadvantage that they are inflammable when in the supplied condition. During the application and/or the drying of the coating, the organic solvents have to be vapourised; therefore, corresponding protective measures are necessary.

SUMMARY OF THE INVENTION

Surprisingly, it was discovered that the known aqueous fire-retardant compositions, based on amino resins or components thereof, ammonium phosphates and further conventional additives, can be considerably improved and that easily workable aqueous fire retardant compositions having good wetting properties can be obtained, resulting, after application, in coatings which are more insensitive to water, if the aqueous fire retardant preparations furthermore contain amino-formaldehyde resins which are dissolved in organic solvents and are etherified with alcohols with 1 to 12 C-atoms.

DETAILS

The aqueous fire-retardant preparations to be used according to the invention, which serve as starting material and which are known per se, moreover are obtained from the usual ammonium phosphates, amino resins, and/or the components thereof, and additives; whereby different types of reactions may take place, according to the method of preparation in each case. As further additives, there come into consideration, among others, substances rich in carbon, which sometimes also are designated as skeleton forming materials - such as pentaerythritol; carbohydrates such as starch and dextrin; furthermore, fillers such as glass or mineral fibres, mineral powder, silicates, e.g. calcium silicate, kaolin, mica, trass powder, talcum, slate powder, mineral wool (rock wool), slag wool, foundry slagwool, barium sulphate, furthermore alkaline earth and heavy metal phosphates; zirconium, lead compounds, or the like. Moreover, it is possible also to mix-in acid-resistant pigments e.g. iron oxide, titanium dioxide, chromium oxide, or the like.

Suitable ammonium phosphates are, for example, monoammonium orthophosphate, diammonium orthophosphate, which are used optionally together with an acid, for example with phosphoric acid, lactic acid, acetic acid, formic acid, or the like.

In the usual aqueous fire-retardant preparations, the proportion of amino resins may amount to within the range of 5 to 60, preferably 10 to 40 percent by weight; that of the ammonium phosphates, within the range of 20 to 50, preferably 25 to 40, percent by weight; that of the skeleton forming materials within the range of 3 to 30, preferably 5 to 20, percent by weight, in each case based on the amount of solids in the aqueous preparation. The total proportion of further possible additives, e.g. the above mentioned, inclusive of possible fillers and pigments, may amount to 50 percent by weight, relatively to the proportion of solids in the aqueous solution; whereby the sum of amino resins, ammonium phosphates, and further additives always must add up to 100%.

The finished fire-retardants according to the invention generally have a proportion of solids of at least 40, and not more than 85, percent by weight. In individual cases, however, it also may be higher. Preferably the proportion of solids amounts to from 50 to 75 percent by weight. The fire-retardants may be thixotropic, and, after stirring, must be able to be easily painted on or sprayed on.

The amino-formaldehyde resins, non-etherified and known per se, which are to be used according to the invention, generally are obtained by the usual reaction of urea and/or melamine and/or other triazines and preferably also dicyanodiamide, in the presence of small amounts of alkali or acid, and preferably also in the presence of amonium phosphates. As triazines, for example, also benzoguanamine, acetoguanamine, and ditriazines, such as succinoguanamine, or adipoguanamine, are suitable. For each active hydrogen atom in the urea, in the dicyanodiamide, and in the triazine ring, generally up to 1, preferably up to 0.75 mol of formaldehyde is used; however, the quantity of formaldehyde amounts to at least 0.25 mol per active hydrogen atom in the urea, dicyanodiamide, or triazine ring. The dynamic viscosity of the commercial amino resins (Ia and II) in the fire-retardant compositions may be varied within a wide range, e.g. between 600 and 6000 CP, according to their content of solid body, their molar ratio of amine : formaldehyde and their way of preparation.

The etherified amino-formaldehyde resins are obtained by the etherification of urea- and/or triazine methylol compounds which have been obtained in the presence of small amounts of alkali or acid, with the amounts of formaldehyde previously indicated; with alcohols with up to 12 C-atoms, according to methods known per se; however, in the reaction of triazines, there should have been reacted at least 0.4 mol formaldehyde per active hydrogen atom which may be substituted. Generally in these resins the molar ratio of urea : formaldehyde is within the range from 1:1 to 1:4 and that of melamine : formaldehyde within the range from 1:2 to 1:6.

As etherification compounds, preferably alcohols with 1 to 6 C-atoms, such as methanol, ethanol, propanol, isopropanol, and isobutanol, the various primary hexanols, and the octanols, may be considered. Due to the etherification, the amino-formaldehyde resins, which were only soluble in water, become soluble in organic solvents. The etherification may be continued until all the methylol groups have reacted with the alcohol, e.g. in the hexamethoxymethyl-melamine. However, generally it is sufficient only to etherify to such an extent that the resin which is formed is soluble at least in the etherifying alcohol itself, or in another added alcohol, or in an aliphatic or aromatic fluid hydrocarbon, preferably in xylene and toluene, or in mixtures of these solvents. The compatibility of the amino resins with the solvents is a measure for their degree of etherification. Thus, a very low degree of etherification effects a compatibility with alcohols only. An etherification being some higher, but in general relatively low causes a compatibility with aromatics, e.g. xylene, at a weight ratio of resin : xylene of 1:1 to 1:2. A high degree of etherification effects a compatibility of the resin with aromatic and aliphatic hydrocarbons at every ratio.

Suitable organic solvents for the etherified amino resins are straight-chain and branched alcohols with 1 to 12, preferably 1 to 6, C-atoms, such as methanol, ethanol, the propanols, the butanols, pentanols, hexanols; ketones, such as methyl ethyl ketone; esters such as ethyl acetate, butyl acetate; aromatic hydrocarbons such as toluene, ethylbenzene, xylenes; aliphatic hydrocarbons, such as hexane, heptane, octane. These aliphatic hydrocarbons, however, are only suitable for use in admixture with other compatible solvents, in particular alcohols and/or aromatic compounds. Preferred solvents are: aromatic hydrocarbons and alcohols, in each case alone or in admixture; whereby those alcohols are to be preferred, which also have been used for etherification of the amino resins. If mixtures of the aromatic compounds and of the alcohols are used as solvent, then their proportions preferably lie within the range of 9 : 1 to 1 : 9.

Of course, it is also possible for mixtures of different amino resins, e.g. melamine- and urea-resin or other triazine resins, to be present in the non-etherified and/or in the etherified amino resins. In the special fire-retardant preparations, the etherified amino resins may be derived from the same amino resins as the non-etherified ones, if these latter have not been built-up on dicyanodiamide; however they also may have another basis, lying within the scope abovementioned.

For preparation of the fire-retardants according to the invention, the etherified amino resins, dissolved in an organic solvent, can be mixed — preferably under stirring — with a previously-prepared conventional aqueous fire-retardant preparation whose amino resin component is non-etherified and has the composition abovementioned.

The etherified amino resin, dissolved in the organic solvent, can itself be combined with conventional fire-retardant preparations in any weight-ratio. Mixture ratios which are preferred, are from 2.5 to 30 parts by weight of etherified amino resin, calculated as solid resin; to 100 parts by weight of the conventional aqueous fire-retardant preparation. The total amount of the amine resins in the finished fire-retardant however, amounts, at most, to 75 percent by weight of the total weight of solids.

The fire-retardants prepared according to the invention generally can be painted-on without difficulty, and can be sprayed-on using the spraying apparatuses customary in the trade. They also will wet smooth surfaces, such as the surfaces of outer casings made of synthetic plastic material, of — in particular electrical — cables, e.g. made of thermo- or duro-plastics; or of steel coated with primer, particularly in constructions made of structural steel — satisfactorily and substantially better than is the case with the known aqueous fire-retardants. The proportion of organic solvents, which, in the finished fire-retardant, generally is less than 15, preferably less than 10, percent, by weight, is so low that the fire-retardants, is themselves, are not inflammable and can be used without taking any special protective measures. Coatings made from them are considerably more resistant to moisture when left lying under the usual atmospheric conditions, through gradual chemical change of the amino resin. Their resistance to moisture can be controlled within wide limits through the type and quantity of the amino resin used.

EXAMPLES

1a. Preparation of an aqueous fire-retardant preparation for comparison and as starting material for the compounds according to Examples 1b, 2 and 3: Thus, 20g urea, 25g dicyanodiamide, 40g monoammonium orthophosphate, 80g of a 30% aqueous formaldehyde solution and 10g dextrin are mixed. The mixture is heated in a vessel to 70°–90° C, whilst stirring. After 30 minutes reaction time, the liquid is cooled.

1b. Preparation of the fire-retardant preparation according to the invention. Into 100 g of the above-mentioned aqueous fire-retardant preparation are stirred a 65% solution of 30 g of a urea-formaldehyde resin (molar ratio of urea : formaldehyde equals about 1:2.2), etherified with butanol to such an extent that a mixture of the resin with xylene, even in a dilution of more than 1:20 does not become turbid, in n-butanol/xylene (weight ratio 2:1), dynamic viscosity about 4000 CP (65% butanol/20° C). A fire-retardant is obtained, whose properties are characterised by the test results which can be seen from the following tables.

2. A fire-retardant according to the invention is obtained when into 100 g of the aqueous fire-retardant preparation named in Example 1a there is stirred a 60% solution of 30 g of melamine formaldehyde resin (molar ratio of melamine : formaldehyde equals 1:6), which is etherified with butanol to such an extent that a mixture of the resin with xylene, even in a dilution of more than 1:15 does not become turbid, in a mixture of n-butanol and xylene (weight ratio 1:2), dynamic viscosity about 1200 CP/20° C (60% in butanol/xylene 1:2). The properties of the fire-retardant can be seen from the tables.

3. For preparation of a fire-retardant according to the invention, there is stirred into 100 g of the aqueous fire-retardant preparation named in Example 1a a 60% solution of 40 g of urea-formaldehyde resin (molar ratio of urea : formaldehyde equals about 1:2.5), which is etherified with butanol to the same extent as the urea-formaldehyde resin in Example 1b, in iso-butanol, dynamic viscosity about 1000 CP (60% in butanol/20° C), furthermore 10 g of glass fibres and 10 g of kaolin. The properties of the fire-retardant can be seen from the tables. The amino resins of Examples 1 to 3 are all completely compatible with xylene.

4. 25 g melamine, 15 g dicyanodiamide, 30 g diammonium orthophosphate, 5 g phosphoric acid, 5 g lactic acid, 80 g of a 30% aqueous formaldehyde solution, and 15 g starch, are mixed. The mixture is heated at 70° to 80° C for 20 minutes. Then the liquid is cooled. 100 g of this aqueous fire-retardant preparation are mixed, whilst stirring, with a 55% solution of 20 g of a melamine formaldehyde resin, etherified with methanol (= hexamethoxymethyl-melamine), in isopropanol/xylene (weight ratio 3:1), 2 g iron oxide yellow, 10 g wolastonit (calcium silicate) and 10 g mica. A fire-retardant is obtained, with good flame-resistant properties.

Fire-retardants which form a layer of foam, according to Examples 1a to 3, were coated-on, in a wet coating-quantity of 1,000 g/m² onto steel plates coated with primer, using a paint brush. After 2 weeks' drying at room conditions, the coated plates were subjected to a water condensation moisture-change of climate — test according to DIN 50 017. The water condensation moisture — change of climate — in each case has a cycle of 8 hours at 40° C and 100% relative air moisture and 16 hours at 20° C and a relative air moisture below 75%.

Table 1 shows the behaviour of coatings with fire-retardant compounds according to Examples 1a to 3 on steel plates coated with primer. Coatings with fire-retardants according to Example 1a had worn off already after 2 cycles, due to the action of the moisture. On the other hand, after 25 cycles, in the case of coatings of fire-retardants according to Examples 1b to 3, practically no changes were observed.

A fire-retardant preparation such as is described in Example 1a, does not completely wet under-surfaces made of synthetic plastics material, e.g. cable sheaths. As it is evident from Table 2, coatings with fire-retardants according to Examples 1b and 2 show no faults with regard to the wetting.

Table 1

Comparison of the behaviour of fire retardant coatings according to Examples 1(a) to 3, on steel which is coated with primer, in condensation water/changing climate, according to DIN 50 017
(Amount coated-on 1,000 g/m² Fire-retardant)

| Coating | Behaviour of the coatings after | | | | |
|---|---|---|---|---|---|
| | 1 cycle | 2 cycles | 3 cycles | 10 cycles | 25 cycles |
| Example 1a (comparison) | coating very soft | coating begins to wear off | coating wears off greatly; undersurface partially exposed | | |
| Example 1b | no change | no change | no change | no substantial change | no substantial change |
| Example 2 | no change | no change | no change | no substantial change | no substantial change |
| Example 3 | no change | no change | no change | no substantial change | no substanital change |

Table 2

Comparison of the wetting of different cable-sheathing surfaces by fire-retardants according to Examples 1a) to 2).

| Coating material | Coated surfaces | Cable sheathing on a basis of | |
|---|---|---|---|
| | | polyvinylchloride | polyethylene |
| Example 1a (comparison) | 200 cm² | 15 wetting faults with about 3 cm² of non-wetted surface | 10 wetting faults with about 5 cm² of non-wetted surface |
| Example 1b | 200 cm² | no wetting faults | no wetting faults |
| Example 2 | 200 cm² | not wetting faults | no wetting faults |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. An aqueous fire-retardant coating composition capable of forming a foam layer and consisting of
   I. an aqueous preparation comprising
      a. a non-etherified amino-formaldehyde resin or its components or a mixture thereof
      b. at least one ammonium phosphate,
      c. a skeleton-forming component and
   II. a solution of at least one further amino-formaldehyde resin being at least partially etherified with at least one alcohol having 1 to 12 C-atoms and dissolved in an organic solvent.

2. A composition as claimed in claim 1 wherein the total amount of the non-etherified amino-formaldehyde (resin is 5 to 60% by weight, that of component b) 20 to 50% by weight and that of component c) 3 to 30% by weight, each referred to the solids content of the aqueous preparation.

3. A composition as claimed in claim 1 additionally containing conventional additives selected from the group consisting of mineral filler, acid-resistant pigment and a combination thereof in a total amount of up to 50% by weight, referred to the solids content of the aqueous preparation.

4. A composition as claimed in claim 1 wherein the solids content of the composition is at least 40% by weight and not more than 85% by weight.

5. A composition as claimed in claim 1 wherein the etherified amino-formaldehyde resin of component II has been prepared in the presence of at least one ammonium phosphate.

6. A composition as claimed in claim 1 containing 2.5 to 30% by weight of the etherified amino resin of component II, referred to 100% by weight of component I.

7. A composition as claimed in claim 1 wherein the etherified amino resin of component II is etherified to such an extent that it is soluble in a monohydric alcohol of 1 to 12 carbon atoms, in an aromatic hydrocarbon or in a mixture of either with an aliphatic hydrocarbon.

8. A composition as claimed in claim 1 wherein the etherified amino-formaldehyde resin is an aminotriazine resin or a urea resin being etherified with at least one alcohol having 1 to 6 C-atoms.

9. A composition as claimed in claim 1 wherein the solvent of component II is an (aromatic hydrocarbon)/(monohydric alcohol) admixture in a weight ratio of 9:1 to 1:9.

10. An aqueous coating composition as claimed in claim 1 wherein the skeleton-forming component is a member selected from the group consisting of pentaerythritol and a carbohydrate, the amino-formaldehyde resin which is at least partially etherified is a resin selected from the group consisting of a urea-methylol resin, a triazine-methylol resin and a urea- and triazine-methylol resin, the total amount of component (a) is from 5 to 60 percent by weight and that of component (b) is from 20 to 50 percent by weight, each based on the solids content of the aqueous preparation, and the amount of etherified amino-formaldehyde resin of component II is from 2.5 to 20 percent by weight, based on 100 percent by weight of component I.

11. A composition as claimed in claim 10 wherein the organic solvent of component II is a mixture of aromatic hydrocarbon and monohydric alcohol in a weight ratio of from 9 : 1 to 1 : 9.

12. In a heat-foamable fire-retardant composition having a) a skeleton-forming component and b) at least one ammonium phosphate component, the combination of c) an aqueous phase with non-etherified amino-formaldehyde resin or components thereof and d) an organic-solvent solution of amino-formaldehyde resin at least partially etherified with alcohol having from 1 to 12 carbon atoms; the amino-formaldehyde resin which is at least partially etherified being other than a resin based on dicyanodiamide when the non-etherified amino-formaldehyde resin of (c) is based on dicyanodiamide.

13. A composition as claimed in claim 3 wherein the acid-resistant pigment is a member selected from the group consisting of iron oxide, titanium oxide and chromium oxide.

* * * * *